(12) United States Patent
Gaenzle et al.

(10) Patent No.: US 9,932,915 B2
(45) Date of Patent: Apr. 3, 2018

(54) METHOD FOR OPERATING AN INTERNAL COMBUSTION ENGINE IN AN IDLE MODE

(71) Applicant: Robert Bosch GmbH, Stuttgart (DE)

(72) Inventors: David Gaenzle, Leinfelden-Echterdingen (DE); Wolfgang Fischer, Gerlingen (DE); Laurent Nack, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 298 days.

(21) Appl. No.: 14/482,762

(22) Filed: Sep. 10, 2014

(65) Prior Publication Data

US 2015/0068493 A1 Mar. 12, 2015

(30) Foreign Application Priority Data

Sep. 12, 2013 (DE) .................... 10 2013 218 308

(51) Int. Cl.
*F02D 37/02* (2006.01)
*F02D 41/08* (2006.01)
*F02D 41/00* (2006.01)
*F02D 41/02* (2006.01)
*F02D 31/00* (2006.01)
(Continued)

(52) U.S. Cl.
CPC ........... *F02D 37/02* (2013.01); *F02D 31/003* (2013.01); *F02D 31/008* (2013.01); *F02D 35/021* (2013.01); *F02D 35/023* (2013.01); *F02D 35/028* (2013.01); *F02D 41/008* (2013.01); *F02D 41/0255* (2013.01); *F02D 41/08* (2013.01); *F02P 5/1508* (2013.01); *F02D 41/083* (2013.01); *F02D 41/16* (2013.01); *F02D 2041/001* (2013.01); *F02D 2041/141* (2013.01); *F02D 2041/1418* (2013.01); *F02D 2200/0802* (2013.01); *Y02T 10/26* (2013.01); *Y02T 10/46* (2013.01)

(58) Field of Classification Search
CPC .... F02D 37/02; F02D 41/008; F02D 41/0255; F02D 31/003; F02D 31/008; F02D 35/021; F02D 35/023; F02D 35/028; F02D 41/08; F02D 41/16; F02D 41/083; F02D 2041/001; F02D 2041/141; F02D 2041/1418; F02D 2200/0802; F02P 5/1508; Y02T 10/26; Y02T 10/46
See application file for complete search history.

(56) References Cited

U.S. PATENT DOCUMENTS

| | | | | |
|---|---|---|---|---|
| 4,528,956 | A | * | 7/1985 | Ogata ...................... F02D 37/02 123/406.47 |
| 5,139,002 | A | * | 8/1992 | Lynch ....................... C10L 3/00 123/27 GE |

(Continued)

*Primary Examiner* — Hung Q Nguyen
*Assistant Examiner* — Brian P Monahon
(74) *Attorney, Agent, or Firm* — Norton Rose Fulbright US LLP; Gerard Messina

(57) ABSTRACT

A method for operating an internal combustion engine in an idle mode, in which an ignition angle and/or an air quantity of the internal combustion engine is influenced and/or is modified as a function of an idle rotation speed of the internal combustion engine. The ignition angle and/or the air quantity and/or a fuel quantity for at least one combustion chamber of the internal combustion engine is modified as a function of at least one variable characterizing a combustion event in the combustion chamber.

18 Claims, 4 Drawing Sheets

(51) Int. Cl.
*F02D 35/02* (2006.01)
*F02D 41/16* (2006.01)
*F02D 41/14* (2006.01)
*F02P 5/15* (2006.01)

(56) References Cited

U.S. PATENT DOCUMENTS

| | | | | |
|---|---|---|---|---|
| 5,492,094 A * | 2/1996 | Cullen | ............... | F02D 31/005 123/339.11 |
| 5,540,202 A * | 7/1996 | Cullen | ............... | F02D 41/024 123/406.47 |
| 6,560,526 B1 * | 5/2003 | Matekunas | ......... | F02D 41/1498 123/435 |
| 6,659,073 B1 * | 12/2003 | Franke | ............... | F02D 35/027 123/299 |
| 6,848,421 B1 * | 2/2005 | Karau | ............... | F02D 35/021 123/406.22 |
| 2003/0221665 A1 * | 12/2003 | Miyamoto | ............. | F02D 37/02 123/339.11 |
| 2007/0056560 A1 * | 3/2007 | Trask | ............. | F01L 9/04 123/435 |
| 2007/0186903 A1 * | 8/2007 | Zhu | ............. | F01N 3/2006 123/406.37 |
| 2008/0215226 A1 * | 9/2008 | Sauer | ............... | F02D 41/0057 701/102 |
| 2008/0245342 A1 * | 10/2008 | Werner | ............... | F02D 41/06 123/491 |
| 2010/0168989 A1 * | 7/2010 | Gao | ............... | F02D 41/2422 701/110 |
| 2011/0239988 A1 * | 10/2011 | Reiche | ............... | F02P 5/1506 123/406.76 |
| 2012/0138016 A1 * | 6/2012 | Martin | ............... | F02D 37/02 123/406.23 |

* cited by examiner

METHOD FOR OPERATING AN INTERNAL COMBUSTION ENGINE IN AN IDLE MODE

RELATED APPLICATION INFORMATION

The present application claims priority to and the benefit of German patent application no. 10 2013 218 308.9, which was filed in Germany on Sep. 12, 2013, the disclosure of which is incorporated herein by reference.

FIELD OF THE INVENTION

The present invention relates to a method for operating an internal combustion engine in an idle mode, and to a related open- and/or closed-loop control device and a computer program.

BACKGROUND INFORMATION

Exhaust gas catalytic converters can advantageously improve the exhaust gases of internal combustion engines, in a manner known per se, by the fact that harmful constituents of the exhaust gas are converted into less harmful constituents by catalytic conversion. It is known that an exhaust gas catalytic converter requires a minimum operating temperature for this. Below this minimum operating temperature the effect of the exhaust gas catalytic converter is low or not present at all. This is important, for example, in an idle mode after a cold start of the internal combustion engine.

SUMMARY OF THE INVENTION

An object in which the present invention is based may be achieved by a method as described herein and by a related open- and/or closed-loop control device and a computer program as recited in the coordinated claims. Advantageous refinements are described in the further descriptions herein. Features important for the present invention are furthermore present in the description below and in the drawings. The features can be important for the present invention both in isolation and in various combinations, although this will not be explicitly referred to again.

The present invention relates to a method for operating an internal combustion engine in an idle mode, in particular after a cold start, an ignition angle and/or an air quantity of the internal combustion engine being influenced and/or being modified as a function of an idle rotation speed of the internal combustion engine. According to the present invention the ignition angle and/or the air quantity and/or a fuel quantity for at least one combustion chamber ("cylinder") of the internal combustion engine is modified as a function of at least one variable characterizing a combustion event in the combustion chamber. The ignition angle can be set to be comparatively "late" while stable combustion of fuel in the at least one combustion chamber is nevertheless enabled. A "late" ignition angle enables a comparatively high heat output in the combustion chamber. The advantageous result is that warmup of an exhaust gas catalytic converter in an idle mode of the internal combustion engine can occur particularly quickly, with the result that the exhaust gas catalytic converter becomes effective correspondingly quickly. Thanks to closed- or open-loop control according to the present invention of the warmup of the internal combustion engine, pollutants in the exhaust gas can thus be reduced, and environmental impact decreased. The method according to the present invention can be carried out in internal combustion engines having individual-cylinder injection valves or having intake-manifold injection.

The variable characterizing the combustion event may be a combustion location and/or an average combustion chamber pressure and/or an onset of the combustion event. Variables that are particularly characteristic of the combustion event, which are closely correlated with a heat output of the combustion chamber in the idle mode, are therefore evaluated. In particular, the stability of the combustion event can be particularly reliably monitored or regulated.

The variable characterizing the combustion event can be determined particularly simply from a combustion chamber pressure and/or from a time course of the combustion chamber pressure and/or from a time course of the idle rotation speed and/or by determining an ionization current. By determining and evaluating the respective time course, for example using an integration operation, a heat profile and, from that in turn, the combustion location of the combustion chamber can be determined. These methods are comparatively accurate and thus make it possible to maintain according to the present invention a particularly small necessary safety margin with respect to a limit value of the ignition angle which characterizes the boundary between a stable and an unstable combustion event. Almost optimal operation during warmup of the internal combustion engine is thereby enabled.

The method is improved if it is carried out in individual-cylinder fashion for each combustion chamber of the internal combustion engine. Design- or operation-related tolerances, as well as aging of a respective cylinder or injector, can thereby be compensated for, and the effect of the method according to the present invention in terms of heat output and combustion stability can thus be improved.

In an embodiment of the present invention, provision is made that the air quantity is modified by way of a throttle valve and/or an opening duration of an intake valve. The throttle valve makes it possible to influence the quantity of air delivered to the internal combustion engine in particularly simple and effective fashion. If the internal combustion engine has a so-called "partly variable" valve system, i.e. in particular controllable intake valves, the dead-time proportion can be reduced as compared with a system with closed-loop control using a throttle valve, with the result that the effect according to the present invention of the method can be further improved.

In a further embodiment, provision is made that in the method, a first control loop in which the variable characterizing the combustion event is controlled in closed-loop fashion by way of the ignition angle is used; and that a second control loop in which the rotation speed of the internal combustion engine is controlled in closed-loop fashion by way of the air quantity and/or by way of the quantity of fuel injected is used; and that the first and the second control loop are operated as a function of one another. A separate control loop is thus used for each of the variables to be modified, with the result that the method can be implemented in a particularly clear and simple manner. Because the two control loops act simultaneously on the operation of the internal combustion engine, they can influence one another. Because the two control loops are operated according to the present invention as a function of one another, however, they can be at least partly decoupled from one another and the method can thus be improved. This is accomplished, for example, by the fact that a time constant of the first control loop is dimensioned to be comparatively long, with the result that the first control loop becomes correspondingly "slow." Alternatively or in addition thereto, the injected fuel quantity can be modified as a function of the ignition angle in order to keep the rotation speed constant.

The accuracy of the method can be increased if the first and/or the second control loop are operated in consideration of definable interference variables, in particular using an interference variable impression action (interference variable compensation). Such interference variables are, for example, a temperature of the internal combustion engine and/or of the exhaust gas catalytic converter and/or an activation of a climate control system. A respective output amplitude of a controller in the first and/or in the second control loop can thereby be kept low, so that the accuracy of the respective closed-loop control system can be improved.

In a further embodiment of the present invention, a variance of the variable characterizing the combustion event is determined, and the ignition angle is modified as a function of the determined variance. Provision can be made in particular that in the context of a comparatively large variance, the ignition angle is modified to a comparatively early point in time; and that in the context of a comparatively small variance, the ignition angle is modified to a comparatively late point in time. This means, for example, that when the combustion event is somewhat less stable due to a comparatively large variance, this circumstance is compensated for by shifting the ignition angle into a value range in which greater stability of the combustion event can be expected. Conversely, in the context of a comparatively small variance, the ignition angle is retarded and thus the heat output of the respective combustion chamber is advantageously increased without impairing the stability of the combustion event.

Provision can furthermore be made that the modification of the ignition angle is accomplished for a definable time interval by way of an open-loop control system; and/or that the modification of the ignition angle is modified for a definable time interval as a function of further variables characterizing an operating state of the internal combustion engine, the further variables being used alternatively or in addition to the combustion chamber pressure and the idle rotation speed. This corresponds to a so-called "ignition angle authorization." In a motor vehicle, for example, the idle rotation speed of the internal combustion engine can be undesirably modified as a result of an activation of accessories, for example a climate control system, a radio, a steering motor, and/or a window heater. If, as already described above, the air quantity is modified by way of the throttle valve, the latter may not be able to react quickly enough or may react only with a delay. Because the ignition angle, according to the present invention, is temporarily controlled or is temporarily modified as a function of further variables, disadvantageous effects as a consequence of the activation of accessories can be avoided.

The accuracy of the method is increased if the modification of the ignition angle occurs in steps of approximately 0.25 degree of a crankshaft angle, which may be in steps of approximately 0.2 degree, and which may be in steps of approximately 0.1 degree. Because the method according to the present invention is particularly accurate, and thus the necessary safety margin with respect to the above-described limit value of the ignition angle can be kept particularly low, the small increments according to the present invention for the modification of the ignition angle are particularly suitable. Otherwise a modification of the ignition angle using an increment that is "too big," for example 0.75 degree, could bring about a respectively excessive modification of the combustion location and thus of a torque of the internal combustion engine, and could thus impair the effectiveness of the closed-loop control systems according to the present invention.

The method can be simplified if the ignition angle or the modification of the ignition angle, and/or the air quantity or the modification of the air quantity, and/or the quantity of fuel injected or the modification of the quantity of fuel injected, are stored in individual-cylinder fashion in a data memory; and if in a subsequent idle mode of the internal combustion engine the stored variables are concurrently used for individual-cylinder pilot control. This makes possible pilot control of the individual-cylinder ignition angle in the context of a subsequent cold start and idle mode of the internal combustion engine, so that the above-described control loops need to compensate for only comparatively small system deviations. An adaptation can furthermore be implemented in the pilot control action. The pilot control system is corrected by an amount equal to an average controller output value of, for example, the last ten warmups.

The present invention furthermore encompasses an open- and/or closed-loop control device for an internal combustion engine which is embodied to carry out a method as recited in one of the preceding claims. This can advantageously be accomplished by way of a computer program that is correspondingly programmed to execute the method. In particular, an application complexity can be comparatively small according to the present invention.

Examples of embodiments of the present invention are explained below with reference to the drawings.

DETAILED DESCRIPTION

Figure 1:
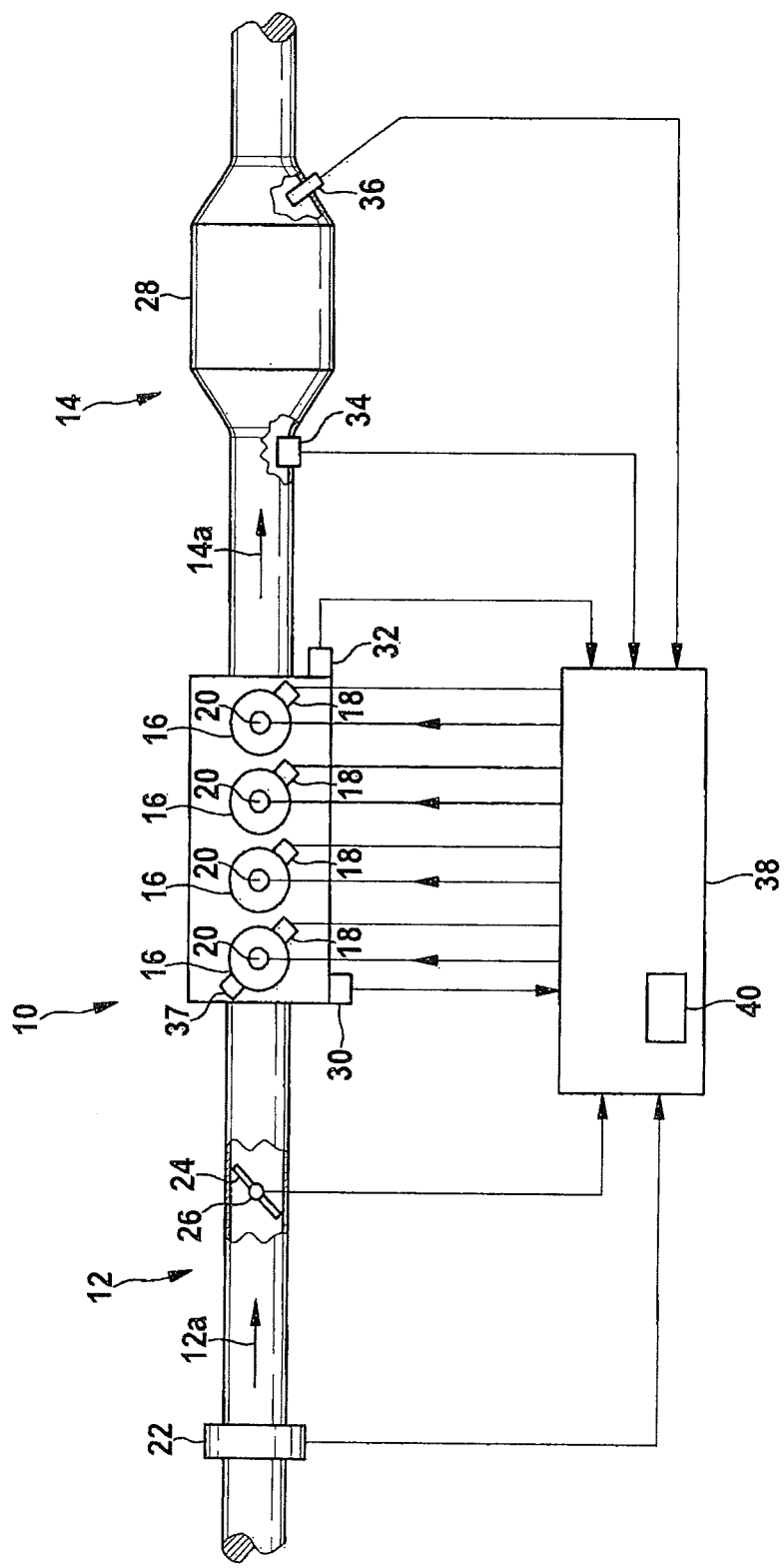
FIG. 1 is a simplified diagram of an internal combustion engine having an air supply duct and an exhaust gas duct.

The same reference characters are used in all Figures for functionally equivalent elements and variables, including for different embodiments.

FIG. 1 shows, schematically and in highly simplified fashion, an internal combustion engine 10 having an air supply duct 12 in a region on the left of the drawing, and an exhaust gas duct 14 in a region on the right of the drawing. Arrows 12a and 14a indicate a respective flow direction. Internal combustion engine 10 encompasses in the present case four cylinders 16 ("combustion chambers") having injection valves 18 and spark plugs 20 respectively disposed thereon.

Air supply duct 12 encompasses an air quantity sensor 22 and a throttle valve 24 having a sensor 26 disposed thereon for sensing an opening angle ("position") of throttle valve 24. Exhaust gas duct 14 encompasses an exhaust gas catalytic converter 28. A temperature sensor 30 and a rotation speed sensor 32 for sensing a rotation speed of a crankshaft (not depicted) are disposed on internal combustion engine 10, and a lambda probe 34 and a temperature sensor 36 for sensing an exhaust gas temperature are disposed on exhaust gas catalytic converter 28. In addition, the left (in FIG. 1) cylinder 16 has a cylinder pressure sensor 37.

Sensors 22, 26, 30, 32, 34, and 36 are connected to an open- and/or closed-loop control device 38 via respective electrical leads (no reference characters). The four injection valves 18 and the four spark plugs 20 are also electrically connected to open- and/or closed-loop control device 38. Spark plugs 20 are embodied as conventional spark plugs 20 or as laser spark plugs. Open- and/or closed-loop control device 38 furthermore encompasses a computer program 40.

During operation, internal combustion engine 10 controls in open- or closed-loop fashion the injection of fuel into cylinders 16 by applying control to the four injection valves 18. Control is likewise applied to spark plugs 20 at a respectively defined ignition angle 76 (see FIG. 4). Control is generally applied to injection valves 18 and to spark, plugs 20 in individual-cylinder fashion.

For an idle mode of internal combustion engine 10, in particular after a cold start, ignition angles 76 of cylinders 16 and/or an air quantity supplied to internal combustion engine 10, inter alia, are influenced and/or modified as a function of an idle rotation speed 64 (FIG. 4) of internal combustion engine 10. In addition, ignition angles 76, and/or the air quantity, and/or a fuel quantity of cylinders 16 that is controllable in open-loop fashion via injection valves 18, are modified as a function of at least one variable characterizing a combustion event in cylinders 16. This may be accomplished in individual-cylinder fashion, and is explained in further detail by way of FIGS. 2 to 5 below.

Figure 2:
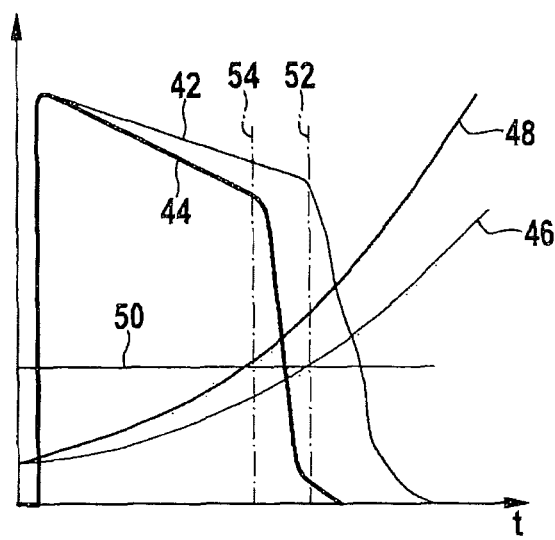
FIG. 2 is a first diagram in which a temperature of a catalytic converter and a quantity of hydrocarbons in the exhaust gas are plotted over time, for an idle mode of the internal combustion engine of FIG. 1.

FIG. 2 is a time diagram for the idle mode of internal combustion engine 10. The coordinate system depicted in FIG. 2 schematically shows a total of four curves over a time t. A first curve 42 and a second curve 44 respectively show a hydrocarbon (HC) concentration downstream from exhaust gas catalytic converter 28. A third curve 46 and a fourth curve 48 show a respective associated temperature profile in exhaust gas duct 14 (temperature sensor 36). In the time range shown in FIG. 2, curves 46 and 48 rise approximately parabolically over time t.

For curves 42 and 46, ignition angles 76 and the air quantity adjustable by way of throttle valve 24 are influenced by way of an open-loop control system or a fixed pre-setting, and/or are modified as a function of idle rotation speed 64 of internal combustion engine 10, i.e. for example are controlled in closed-loop fashion as a function of idle rotation speed 64. Curves 42 and 46 thus substantially characterize the existing art.

For curves 44 and 48, ignition angles 76 and the air quantity adjustable by way of throttle valve 24 are modified, which may be controlled in closed-loop fashion, according to the present invention as a function of idle rotation speed 64 and furthermore as a function of the variable characterizing the combustion event in cylinders 16. The variable characterizing the combustion event is here a combustion location 49 (see FIGS. 3 and 4), i.e. a "center point" in time of the combustion event, and/or an average combustion chamber pressure generated by the combustion event and/or an onset of the combustion event. In addition to the modification of ignition angles 76 and of the air quantity, an injected quantity of fuel defined by injection valves 18 can also be modified in individual-cylinder fashion. Combustion location 49 will be explained further in the context of FIG. 3.

If cylinders 16 are embodied with a so-called "partly variable" valve system, in which respective intake valves (not depicted) of cylinders 16 can be displaced dynamically, then despite possibly different combustion locations 49, a substantially identical torque over all cylinders 16 can be achieved by adapting the individual-cylinder air quantity. This is accomplished by way of a modification, optionally even in individual-cylinder fashion, of an opening duration of the intake valves, and optionally in addition to a modification of a position of throttle valve 24.

The variable characterizing the combustion event can be determined, for example, from the combustion chamber pressure and/or from a time course of the combustion chamber pressure. This may be accomplished using cylinder pressure sensor 37, which can be disposed (as in this case) on one or also on all cylinders 16 of internal combustion engine 10. Alternatively or in addition, the variable characterizing the combustion event can be determined in a manner known per se from a time course of idle rotation speed 64. A further alternative is possible by way of a determination of an ionization current. Additional consideration is also given, for the modification according to the present invention of ignition angle 76 and of the air quantity, to definable interference variables, for example a temperature of internal combustion engine 10 and a temperature of the exhaust gas.

A horizontal line 50 characterizes a threshold temperature or "light-off temperature" of exhaust gas catalytic converter 28, below which a certain minimum catalytic activity is no longer present. Two vertical dashed lines 52 and 54 intersect line 50 together with curves 46 and 48, and characterize their respective exceedance of the threshold temperature characterized by line 50.

It is evident that in accordance with curve 44, the hydrocarbon concentration in the exhaust gas downstream from exhaust gas catalytic converter 28 decreases appreciably more quickly, as a consequence of the rapid temperature rise in exhaust gas catalytic converter 28 characterized by curve 48, than is the case according to curve 42. Pollutant emissions in the idle mode of internal combustion engine 10 can thus be appreciably decreased.

Figure 3:
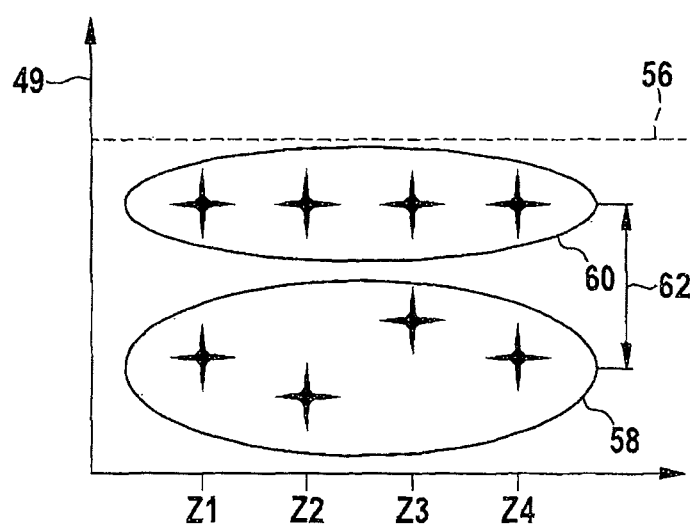
FIG. 3 is a second diagram in which a combustion location is plotted against cylinders of the internal combustion engine, for the idle mode of the internal combustion engine.

FIG. 3 is a two-dimensional diagram. The four cylinders 16 of internal combustion engine 10 of FIG. 1, labeled Z1 to Z4, are indicated on the abscissa of the coordinate system depicted. Combustion location 49 with reference to an angle of the crankshaft (crankshaft angle) of internal combustion engine 10 is depicted on the ordinate of the coordinate system depicted. An upper region in the drawing signifies a relative late combustion event, and a lower region in the drawing signifies a relatively early combustion event.

A horizontal dashed line 56 denotes a limit value for stable operation of internal combustion engine 10. Below line 56 in the drawing, the combustion event in cylinders 16 is stable, and in a region above line 56 combustion misfires can be expected, i.e. the operation of internal combustion engine 10 is not stable in this region.

A first ellipse 58 in a lower region of FIG. 3 symbolically encompasses four crosses (no reference characters) that represent by way of example the idle mode of cylinders 16 in accordance with the existing art described in FIG. 2. A second ellipse 60 in an upper region of FIG. 3 encompasses four further crosses (no reference characters) that characterize the method according to the present invention.

When internal combustion engine 10 is operated according to the existing art in accordance with lower ellipse 58, it is apparent that cylinders 16 behave comparatively differently relative to one another. This relates in particular to deviations in the injected fuel quantity due to sample-related or age-related variations in injection valves 18, and/or differences in air quantities supplied, and/or different ignition delays in cylinders 16. In addition, cylinders 16 can also exhibit, as a consequence of sample variations and aging effects, behaviors that vary overall during the idle mode in a manner that is almost impossible to predict. A comparatively large safety margin with respect to line 56 is thus correspondingly necessary.

When internal combustion engine 10 is operated according to the present invention in accordance with second ellipse 60, ignition angles 76 and/or the air quantity and/or the injected fuel quantity are modified in individual-cylinder fashion as a function of idle rotation speed 64 of internal combustion engine 10 and also as a function of the at least one variable characterizing the combustion event in cylinders 16. As a consequence of combustion location 49 regulated in this fashion, the deviations among the four cylinders 16 are very small or in fact almost zero. This makes it possible, as depicted in the present case in FIG. 3, to "shift" combustion locations 49 comparatively close to the limit value characterized by line 56. This may be accomplished by closed-loop control, as will be explained below in further detail with reference to FIGS. 4 and 5. An arrow 62 describes the advantage achieved.

Figure 4:
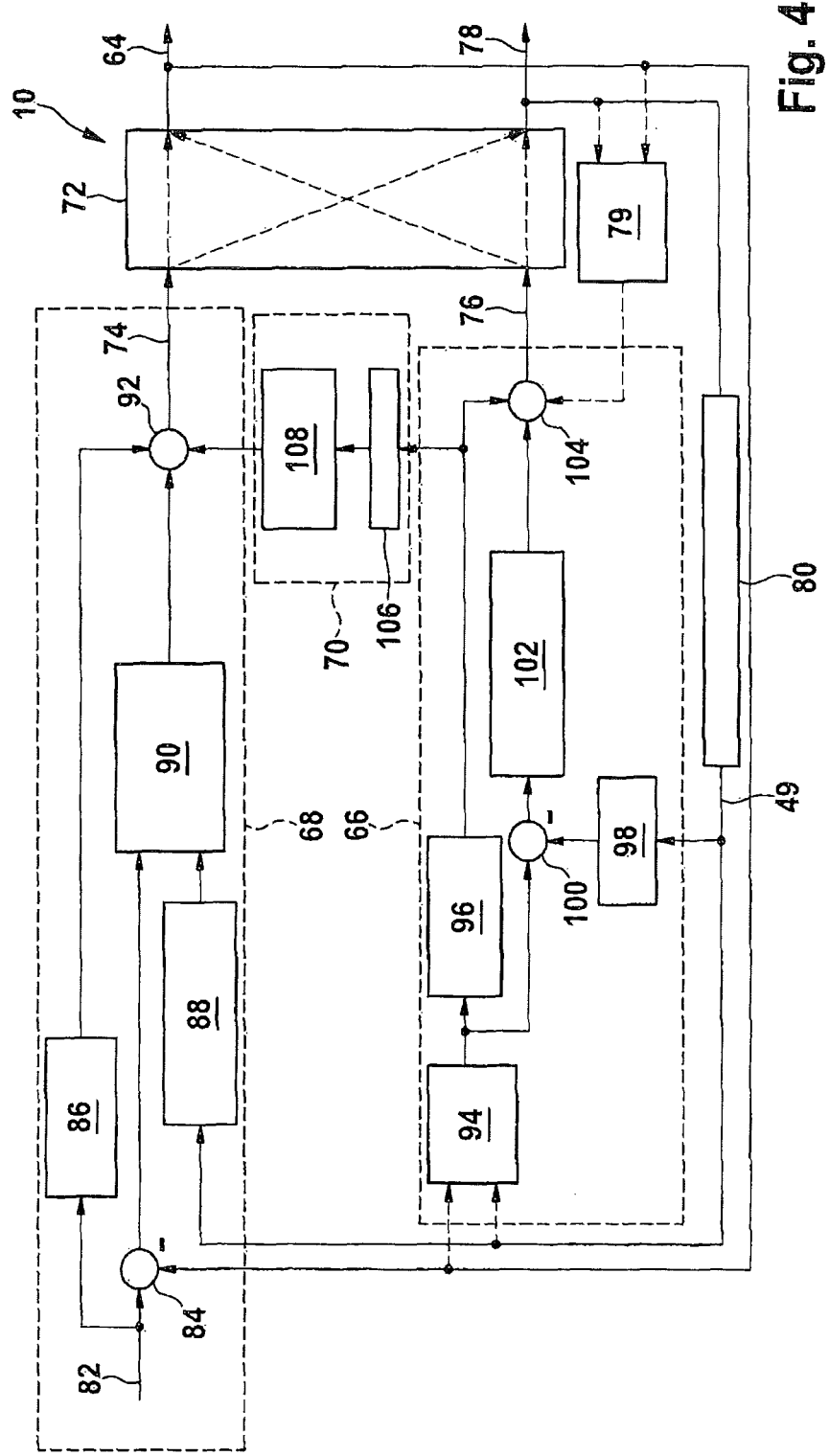
FIG. 4 is a block diagram for a method for the idle mode of the internal combustion engine.

FIG. 4 is a block diagram for a method for the idle mode of internal combustion engine 10. The present block diagram describes a correlation of the variables and method steps described therein, and any parts thereof can be executed by way of an electronic circuit and/or by way of computer program 40.

A dashed-line box 66 in a lower region of the drawing encompasses parts of a first control loop for closed-loop control of combustion location 49. A dashed-line box 68 in an upper region of the drawing encompasses parts of a second control loop for closed-loop control of idle rotation speed 64. Depending on the operating mode of internal combustion engine 10, closed-loop control of idle rotation speed 64 and closed-loop control of combustion location 49 are coupled to one another in undesirable fashion.

A dashed-line box 70 at the center of FIG. 4 characterizes the manner in which the two control loops are operated as a function of one another. In the present case this dependence is one-way, i.e. via the elements encompassed by box 70, signals or variables are conveyed from the first control loop to the second control loop, i.e. from bottom to top in the drawing. By way of an (optional) block 79, however (at the bottom right of the drawing), the dependence of the two control loops can also be two-way, as will be further explained below.

The block diagram of FIG. 4 further encompasses, in a region on the right of the drawing, a block 72 that corresponds to the real internal combustion engine 10 of FIG. 1. Input variables of block 72 are a position 74 of throttle valve 24, as well as ignition angle 76. Position 74 of throttle valve 24 and ignition angle 76 are thus control variables that have a specific influence on the operation of internal combustion engine 10.

Output variables of block 72 are idle rotation speed 64 as well as multiple parameters and operating variables 78, described by one common reference character, of cylinders 16 and of internal combustion engine 10. Parameters and operating variables 78 in the present case encompass design-specific values ("geometry data") of internal combustion engine 10 as well as the crankshaft angle and, in particular, the time course of the individual-cylinder combustion chamber pressure. A total of four dashed-line arrows inside block 72 symbolize the numerous dependences, governed by the operation of internal combustion engine 10, between the output variables and the two input variables at block 72.

Block 79 in the lower right region of the drawing carries out an interference variable compensation action ("interference variable impression") that is dependent of idle rotation speed 64 and on combustion location 49. An output variable of block 79 can optionally be used for the first control loop (box 66). This is depicted in the drawing by way of dashed-line arrows (no reference characters) to the left and right of block 79. Combustion location 49 can thus, in addition, also be modified as a function of idle rotation speed 64, and the stability of the combustion event in a context of differing or fluctuating idle rotation speeds 64 can be improved.

Possible input variables of block 79 are: the current idle rotation speed 64, the above-described parameters and operating variables 78, as well as the temperature of internal combustion engine 10 determined by way of temperature sensor 30, and the temperature of the exhaust gas determined by way of temperature sensor 36. Disposed in a lower region of the drawing is a block 80 ("observer") in which combustion location 49 is determined in particular from parameters and operating variables 78.

A description will be given below firstly of the elements of the second control loop encompassed by box 68. Box 68 encompasses, from left to right at the top of the drawing, a setpoint 82 for idle rotation speed 64, a subtractor 84, a pilot controller 86 for position 74 of throttle valve 24, a block 88 to compensate for interference as a consequence of modifications of ignition angle 76, a rotation speed controller 90, and an adder 92, the output variable of which is that position 74 of throttle valve 24 which is to be controlled. Input variables of subtractor 84 are setpoint 82 of idle rotation speed 64, and idle rotation speed 64 itself. The two are subtracted from one another and delivered to rotation speed controller 90 as a first input variable.

In addition, the setpoint of idle rotation speed 64 is delivered to pilot controller 86, the output variable of which is delivered to adder 92. In addition, combustion location 49 determined in block 80 is delivered to block 88, the output variable of which is delivered to rotation speed controller 90 as a second input variable. An output variable of rotation speed controller 90, as well as an output variable generated in box 70, are delivered to adder 92.

The elements of the first control loop that are encompassed by box 66 will be described below. Box 66 at the bottom of the drawing encompasses, from left to right, a block 94 for defining a setpoint for combustion location 49; a pilot controller 96 for ignition angle 76; a block 98 for post-processing of the signal, generated by block 80, for combustion location 49; a subtractor 100; a controller 102 for combustion location 49; and an adder 104 whose output variable is ignition angle 76.

Two dashed-line arrows (no reference characters) to the left of block 94 in the drawing symbolize the fact that the setpoint for combustion location 49 can optionally be defined as a function of one or more variables, for example as a function of idle rotation speed 64, parameters and operating variables 78, the temperature of internal combustion engine 10, and the temperature of the exhaust gas. An output variable of block 94 is delivered to subtractor 100 and to pilot controller 96. An output variable of pilot controller 96 is delivered to adder 104 as a first input variable.

An output variable of block 98 is delivered to subtractor 100 as a second input variable. Subtractor 100 can thus calculate a difference between the setpoint of combustion location 49 and an actual value of combustion location 49, and deliver the difference to controller 102 as an input variable. An output variable of controller 102 is delivered to adder 104. In addition, an output variable of block 79 can likewise be delivered to adder 104. This is not obligatorily necessary, however, and for that reason the associated signal path is drawn with a dashed line in FIG. 4.

The elements encompassed by box 70 encompass, from bottom to top in the drawing, a block 106 ("coupling," An) and a block 108 ("compensation") whose output variable is delivered, as described above, to adder 92. A coupling mechanism between the two control loops is, so to speak, stored in block 106, and a compensation signal for decoupling is generated therefrom in block 108.

In general, the control loops characterized by boxes 66 and 68 exhibit time-related behaviors that differ from one another. In other words, modification of the air quantity and thus of idle rotation speed 64 by way of throttle valve 24 occurs, for example, relatively slowly or in delayed fashion as a result of the dead volume in the intake duct, and modification of combustion location 49 by way of ignition angle 76 is comparatively fast and can be accomplished at each working cycle of cylinders 16.

In general, a modification of ignition angle 76 results in a non-negligible modification of idle rotation speed 64 due to a change in the torque of internal combustion engine 10. In order to improve the mutual decoupling of the two first and second control loops characterized respectively by boxes 66 and 68, a transfer function of controller 102 can, for example, be modified in such a way that the closed-loop control of ignition angle 76 is slowed. Alternatively or in addition, the fuel quantity injected into cylinders 16 by way of injection valves 18 can also be modified in individual-cylinder fashion. For example, in the context of an idle rotation speed 64 that is too high as a consequence of an advanced ignition angle 76, the quantity of fuel injected can be reduced with the result that idle rotation speed 64 is likewise reduced.

The manner in which idle rotation speed 64 is controlled in closed-loop fashion can also be modified in undesired fashion by further interference variables. This occurs, for example, when a climate-control system, a radio, a steering motor, or a window heater is actuated in a motor vehicle. Because the change in air delivery by way of throttle valve 24 occurs, as described above, comparatively slowly or in time-delayed fashion, ignition angle 76 can in addition be, so to speak, "authorized." For this, the modification of ignition angle 76 can be accomplished for a definable time interval by way of an open-loop control system, and/or the modification of ignition angle 76 can be modified, for a definable time interval, as a function of further variables characterizing an operating state of internal combustion engine 10. These further variables can be used alternatively or in addition to the combustion chamber pressure and idle rotation speed 64. An interference variable compensation action can furthermore be performed by way of block 79, as already described above.

In block 80, a respective heat profile for cylinders 16 can be determined from a filtered output signal of cylinder pressure sensor 37. From the heat profile thereby determined, combustion location 49 can in turn be determined. Alternatively to cylinder pressure sensor 37, a time course of idle rotation speed 64 can also be evaluated in order to determine therefrom, in a manner known per se, a torque of internal combustion engine 10 and, from that in turn, the said heat profile and combustion location 49. A further possibility for determining combustion location 49 is to determine an ionization current.

Alternatively or additionally, a variance of the variable characterizing the combustion event can furthermore be determined, i.e., for example, a variance of combustion location 49 or a variance of the average combustion chamber pressure, with which a combustion stability is respectively characterized. Ignition angle 76 can be modified as a function of the determined variance; for a comparatively large variance, ignition angle 76 is modified to a comparatively early point in time, and for a comparatively small variance, ignition angle 76 is modified to a comparatively late point in time (which is particularly favorable for warming up exhaust gas catalytic converter 28).

Alternatively to a determination of combustion location 49, a combustion onset can also be determined as a controlled variable in the respective cylinders 16, and can be used to adjust ignition angle 76 or for closed-loop control of idle rotation speed 64. The combustion onset can likewise be determined, as described above for combustion location 49, from the time course of the combustion chamber pressure or from the time course of idle rotation speed 64. Because combustion in cylinders 16 occurs comparatively late with reference to the crankshaft angle following a cold start with internal combustion engine 10 in idle mode, the determination of the heat profile can possibly be inaccurate. Determination of the onset of combustion can therefore in some cases be the better alternative. It is possible in general to use, for the method described, almost any other operating variable of internal combustion engine 10 which characterizes combustion location 49 and can be robustly calculated.

If internal combustion engine 10 encompasses a partly variable valve system in which the filling of cylinders 16 is controlled by way of the valve lift curves of the intake valves, the method in accordance with the block diagram of FIG. 4 can be further improved. Closed-loop control of air delivery can possibly even be accomplished in individual-cylinder fashion, and thereby improved. Open-loop control of the intake valves can occur with almost no delay as compared with an adjustment of throttle valve 24, and can occur at each working cycle of cylinders 16.

It is particularly advantageous if setpoints for combustion location 49 are defined in individual-cylinder fashion (see block 94 of FIG. 4). In a four-cylinder engine, for example, the two outer cylinders 16 of internal combustion engine 10 can be adjusted to a somewhat earlier setpoint for combustion location 49 than the two inner cylinders 16. It is possible in general for cylinders 16 that are critical during the warmup of internal combustion engine 10 (i.e. cylinders 16 having relatively poor combustion stability) to be operated with a somewhat earlier combustion location 49. For example, the critical cylinders 16 can be operated with a combustion location 49 that corresponds to a crankshaft angle of between 1 degree and 3 degrees with reference to a top dead center point.

If the above-described partly variable valve system is present, which system adjusts the air quantity or filling of the individual cylinders 16 in individual-cylinder fashion via the respective intake valves, a substantially identical individual-cylinder torque can then be achieved, despite differences in individual-cylinder combustion locations 49, via individual-cylinder modification of the air quantity and/or of the injected fuel quantity. The smoothness of internal combustion engine 10 can thereby be improved.

Because a comparatively late combustion location 49 in the vicinity of the limit value designated by line 56 (see FIG. 3) is generally desirable during the warmup of internal combustion engine 10, it is advantageous to perform a modification of ignition angle 76 in comparatively small steps. Particularly advantageous increments are 0.25 degree or 0.2 degree or 0.1 degree with reference to the crankshaft angle.

The method described by way of the block diagram of FIG. 4 can furthermore be improved if ignition angle 76, or a modification of ignition angle 76 with reference to a setpoint, and/or the air quantity or a modification of the air quantity with reference to a setpoint, and/or the injected fuel quantity or a modification of the injected fuel quantity with respect to a setpoint, are stored in individual-cylinder fashion in a data memory of open- and/or closed-loop control device 38. The stored variables can then advantageously be concurrently used for individual-cylinder pilot control in a subsequent idle mode of internal combustion engine 10, and the accuracy of the method is thereby further increased.

Figure 5:
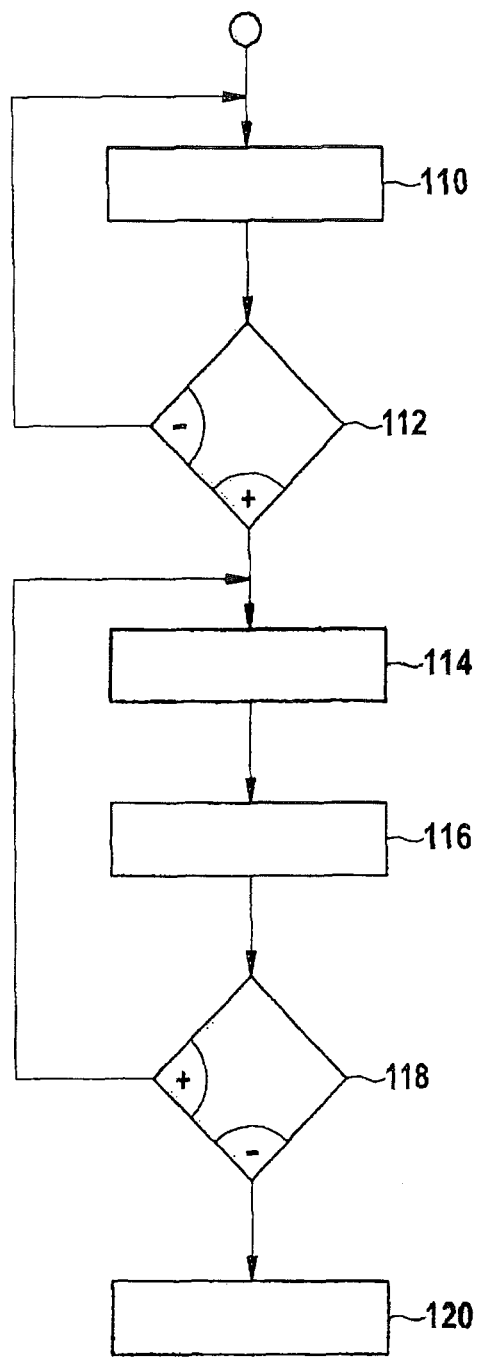
FIG. 5 is a flow chart for a method for the idle mode of the internal combustion engine.

FIG. 5 is a flow chart for the operation of internal combustion engine 10 in the idle mode. The procedure depicted in FIG. 5 may be executed by way of computer program 40. In a first block 110, a rotation speed and a temperature of internal combustion engine 10, as well as a temperature of exhaust gas catalytic converter 28, are determined.

A subsequent query block 112 checks, by way of the determined variables, whether internal combustion engine 10 is in an idle mode after a cold start. A check is made in particular as to whether the temperature of exhaust gas catalytic converter 28 is below a threshold value or "light-off temperature." If so, execution branches to a subsequent block 114. If not so, execution loops back to the beginning of block 110. In block 114, idle rotation speed 64 and the variable characterizing the combustion event in the combustion chamber are determined. The latter variable may be combustion location 49.

In a subsequent block 116, ignition angle 76 and the air quantity delivered to cylinders 16, as well as optionally the fuel quantity injected into cylinders 16, are modified in individual-cylinder fashion as a function of the determined idle rotation speed 64 and combustion location 49. This is accomplished, if applicable, using values for ignition angle 76, and for the air quantity or the position of throttle valve 24, that have been stored in the context of a previous idle mode of internal combustion engine 10. In addition, a variance of combustion location 49 is determined, and defined interference variables are taken into consideration by interference variable impression.

A subsequent query block 118 checks whether the conditions of idle mode and an excessively low temperature of exhaust gas catalytic converter 28 still exist. If so, execution then branches to the input of block 114. If not so, execution then branches to a subsequent block 120. In block 120, current values for ignition angle 76 and for the position of throttle valve 24, as well as optionally further variables and parameters, are stored in a data memory of open- and/or closed-loop control device 38. The procedure depicted in FIG. 5 then ends.

What is claimed is:

1. A method for operating an internal combustion engine having a plurality of combustion chambers, the method comprising: performing, during an idle mode of the internal combustion engine after a cold start of the internal combustion engine, the following: at least one of influencing and modifying at least one of an ignition angle, an air quantity, and a fuel quantity for at least one of the combustion chambers of the internal combustion engine as a function of an idle rotation speed of the internal combustion engine, and as a function of at least one variable characterizing a combustion event in the at least one of the combustion chambers, wherein at least one variable that corresponds to the ignition angle, a modified ignition angle, the air quantity, a modified air quantity, the fuel quantity, and a modified fuel quantity, is stored in an individual-cylinder manner in a data memory for individual-cylinder pilot control of the ignition angle; providing a first control loop, in which the variable characterizing the combustion event is controlled in a closed-loop manner by the ignition angle, wherein the first control loop receives a setpoint combustion location and an actual combustion location as inputs and modifies the ignition angle based at least partially on a difference between the actual combustion location and the setpoint combustion location; providing a second control loop in which the idle rotation speed of the internal combustion engine is controlled in a closed-loop manner by at least one of the air quantity and the quantity of fuel injected, wherein the second control loop receives a setpoint idle rotation speed and an actual idle rotation speed as inputs and modifies the idle rotation speed based at least partially on a difference between the actual idle rotation speed and the setpoint idle rotation speed, and wherein the second control loop is different from the first control loop; operating the first control loop and the second control loop as a function of one another; and reducing one or more deviations between the combustion chambers of the internal combustion engine by, in a subsequent idle mode after a subsequent cold start of the internal combustion engine, using the at least one stored variable in the data memory to perform the individual-cylinder pilot control of the ignition angle, wherein a further modification of the ignition angle is accomplished for a definable time interval by an open-loop control system.

2. The method of claim 1, wherein the variable characterizing the combustion event includes at least one of a combustion location, an average combustion chamber pressure, and an onset of the combustion event.

3. The method of claim 1, wherein the variable characterizing the combustion event is determined from at least one of a combustion chamber pressure, a time course of the combustion chamber pressure, a time course of the idle rotation speed, and determining an ionization current.

4. The method of claim 1, wherein the method is carried out in an individual cylinder manner for at least one of the combustion chambers of the internal combustion engine.

5. The method of claim 1, wherein the air quantity is modified by at least one of a throttle valve and an opening duration of an intake valve.

6. The method of claim 1, wherein at least one of the first control loop and the second control loop are operated in consideration of one or more definable interference variables.

7. The method of claim 1, wherein a variance of the variable characterizing the combustion event is determined, and wherein the ignition angle is modified as a function of the determined variance.

8. The method of claim 1, wherein a further modification of the ignition angle is modified for a definable time interval as a function of further variables characterizing an operating state of the internal combustion engine, the further variables being used alone or in addition to a combustion chamber pressure and the idle rotation speed.

9. The method of claim 1, wherein the modification of the ignition angle occurs in steps of approximately 0.25 degrees of a crankshaft angle.

10. An open-loop and/or closed-loop control device for an internal combustion engine having a plurality of combustion chambers, the control device comprising: a program code arrangement having program code for operating an internal combustion engine by performing, during an idle mode of the internal combustion engine after a cold start of the internal combustion engine, the following: at least one of influencing and modifying at least one of an ignition angle, an air quantity, and a fuel quantity for at least one of the combustion chambers of the internal combustion engine as a function of an idle rotation speed of the internal combustion engine, as a function of at least one variable characterizing a combustion event in the at least one of the combustion chambers, wherein at least one variable that corresponds to the ignition angle, a modified ignition angle, the air quantity, a modified air quantity, the fuel quantity, and a modified fuel quantity, is stored in an individual cylinder manner in a data memory for individual-cylinder pilot control of the ignition angle; providing a first control loop, in which the variable characterizing the combustion event is controlled in a closed-loop manner by the ignition angle, wherein the first control loop receives a setpoint combustion location and an actual combustion location as inputs and modifies the ignition angle based at least partially on a difference between the actual combustion location and the setpoint combustion location; providing a second control loop, in which the idle rotation speed of the internal combustion engine is controlled in a closed-loop manner by at least one of the air quantity and the quantity of fuel injected, wherein the second control loop receives a setpoint idle rotation speed and an actual idle rotation speed as inputs and modifies the idle rotation speed based at least partially on a difference between the actual idle rotation speed and the setpoint idle rotation speed, and wherein the second control loop is different from the first control loop; operating the first control loop and the second control loop as a function of one another and reducing one or more deviations between the combustion chambers of the internal combustion engine by, in a subsequent idle mode after a subsequent cold start of the internal combustion engine, using the at least one stored variable in the data memory to perform the individual-cylinder pilot control of the ignition angle, wherein a further modification of the ignition angle is accomplished for a definable time interval by an open-loop control system.

11. A non-transitory computer readable medium having a computer program, which is executable by a processor, comprising: a program code arrangement having program code for operating an open-loop and/or closed-loop control device for an internal combustion engine having a plurality of combustion chambers by performing, during an idle mode of the internal combustion engine after a cold start of the internal combustion engine, the following: at least one of influencing and modifying at least one of an ignition angle, an air quantity, and a fuel quantity for at least one of the combustion chambers of the internal combustion engine as a function of an idle rotation speed of the internal combustion engine, as a function of at least one variable characterizing a combustion event in the at least one of the combustion chamber chambers, wherein at least one variable that corresponds to the ignition angle, a modified ignition angle, the air quantity, a modified air quantity, the fuel quantity, and a modified fuel quantity, is stored in an individual-cylinder manner in a data memory for individual-cylinder pilot control of the ignition angle; providing a first control loop, in which the variable characterizing the combustion event is controlled in a closed-loop manner by the ignition angle, wherein the first control loop receives a setpoint combustion location and an actual combustion location as inputs and modifies the ignition angle based at least partially on a difference between the actual combustion location and the setpoint combustion location; providing a second control loop, in which the idle rotation speed of the internal combustion engine is controlled in a closed-loop manner by at least one of the air quantity and the quantity of fuel injected, wherein the second control loop receives a setpoint idle rotation speed and an actual idle rotation speed as inputs and modifies the idle rotation speed based at least partially on a difference between the actual idle rotation speed and the setpoint idle rotation speed, and wherein the second control loop is different from the first control loop; operating the first control loop and the second control loop as a function of one another and reducing one or more deviations between the combustion chambers of the internal combustion engine by, in a subsequent idle mode after a subsequent cold start of the internal combustion engine, using the at least one stored variable in the data memory to perform the individual-cylinder pilot control of the ignition angle, wherein a further modification of the ignition angle is accomplished for a definable time interval by an open-loop control system.

12. The method of claim 1, wherein at least one of the first control loop and the second control loop are operated in consideration of one or more definable interference variables by using an interference variable impression action.

13. The method of claim 1, wherein the modification of the ignition angle occurs in steps of approximately 0.2 degrees of a crankshaft angle.

14. The method of claim 1, wherein the modification of the ignition angle occurs in steps of approximately 0.1 degrees of a crankshaft angle.

15. The method of claim 1, wherein the first control loop and the second control loop are at least partially decoupled from each other.

16. The method of claim 1, wherein the individual-cylinder pilot control comprises using an average value of the at least one stored variable from a plurality of previous idle modes after previous cold starts of the internal combustion engine.

17. The device of claim 12, wherein the individual-cylinder pilot control comprises using an average value of the at least one stored variable from a plurality of previous idle modes after previous cold starts of the internal combustion engine.

18. The medium of claim 13, wherein the individual-cylinder pilot control comprises using an average value of the at least one stored variable from a plurality of previous idle modes after previous cold starts of the internal combustion engine.

* * * * *